United States Patent [19]

Studer

[11] Patent Number: 6,076,451
[45] Date of Patent: *Jun. 20, 2000

[54] DUTCH OVEN TYPE COOKING VESSEL WITH COMBINATION COOKING SURFACE

[76] Inventor: Loye E. Studer, 385 Lake Louise Dr., Tacoma, Wash. 98498

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,646

[22] Filed: Mar. 18, 1997

Related U.S. Application Data

[63] Continuation-in-part of application No. 08/451,299, May 26, 1995, Pat. No. 5,611,264.

[51] Int. Cl.⁷ ..................................................... A47J 37/00
[52] U.S. Cl. ............................... 99/340; 99/397; 99/423; 99/449
[58] Field of Search ............................. 99/422–425, 339, 99/340, 403, 372–380, 352–357, 385, 393, 397, 410–417, 449, 450, 482; 126/25 R, 9 R, 25 A; 220/212, 333, 329, 331

[56] References Cited

U.S. PATENT DOCUMENTS

| 461,120 | 10/1891 | McKinley . | |
|---|---|---|---|
| 1,778,263 | 10/1930 | Lamb | 99/340 X |
| 1,992,843 | 2/1935 | Serenberg et al. . | |
| 2,001,285 | 5/1935 | Rehm | 99/340 |
| 2,313,968 | 3/1943 | Reich | 99/340 X |
| 2,430,582 | 11/1947 | Reich | 99/340 X |
| 2,573,988 | 11/1951 | Saltzberg | 99/421 |
| 2,830,529 | 4/1958 | Jaffe | 99/423 |
| 3,237,552 | 3/1966 | Cronheim | 99/340 |
| 3,537,442 | 11/1970 | Berger | 99/423 |
| 3,623,422 | 11/1971 | Marshall | 99/340 X |
| 3,797,375 | 3/1974 | Cerola | 99/422 X |
| 4,108,141 | 8/1978 | Bauer | 99/422 X |
| 4,131,786 | 12/1978 | Cooper | 219/487 |
| 4,197,018 | 4/1980 | Groen, Jr. | 366/248 |
| 4,267,703 | 5/1981 | Minifie et al. | 62/123 |
| 4,323,773 | 4/1982 | Carpenter | 235/473 |
| 4,343,292 | 8/1982 | Kells et al. | 126/378 |
| 4,439,461 | 3/1984 | Czyzewski et al. | 426/601 |
| 4,445,429 | 5/1984 | Czyzewski et al. | 99/455 |
| 4,491,146 | 1/1985 | Sveds | 137/341 |
| 4,816,635 | 3/1989 | Edamura | 219/10.55 B |
| 4,835,369 | 5/1989 | Oslin | 219/439 |
| 4,837,414 | 6/1989 | Edamula | 219/10.55 B |
| 4,870,835 | 10/1989 | Wolfe et al. | 62/246 |
| 4,957,039 | 9/1990 | Reyes | 99/340 |
| 5,078,050 | 1/1992 | Smith | 99/483 |

*Primary Examiner*—Timothy F. Simone
*Attorney, Agent, or Firm*—R. Reams Goodloe, Jr.

[57] ABSTRACT

A cooking apparatus for alternately cooking, broiling, or grilling foods in a single vessel. The apparatus includes a bottom pan portion which is supported by a lower frame portion. An upper frame is pivotally supported from the bottom pan portion. A top portion is provided, wherein the top portion is pivotally affixed to the upper frame. The top portion includes a reversible combination lid portion and a grille portion. The grille portion of the top portion is the inner wall surface of the lid portion, and is thus located in the upper reaches of the lid portion when the lid portion is in a cooking position. When the top portion is rotated one hundred eighty (180) degrees, the grille portion provides an upwardly exposed grille surface for food preparation. The top portion is shaped suitable for nesting in the bottom pan portion when the upper frame is returned to a normal, grille cooking position. The dutch oven type cook system has heating fluid in the passageways between the double walls and cooks from the sides, top, and bottom with hot oil. Alternately, all or a portion of the unit may be heated electrically. A bottom draw off drain line is provided to allow cryovac chill of the bottom pan portion contents.

20 Claims, 7 Drawing Sheets

DUTCH OVEN TYPE COOKING VESSEL WITH COMBINATION COOKING SURFACE

This invention is a continuation-in-part of prior application Ser. No. 08/451,299, filed May 26, 1995, now U.S. Pat. No. 5,611,264, issued Mar. 18, 1997.

TECHNICAL FIELD OF THE INVENTION

This invention relates to a novel dutch oven type cooking apparatus. More particularly, it relates to a dutch oven type cooking apparatus which has a bottom cooking pan portion and an upper top or lid portion, wherein the upper portion is convertible from a cooker pan lid to a stand alone grille.

BACKGROUND

In institutional and commercial kitchens, there is a continuing need to cook foods using different cooking methods. For example, at breakfast, the main meals may be cooked on a grille, but then at lunch or dinner, it may be desirable to deep fry, roast, or simply heat the foods in bulk. Normally, it is necessary to have a variety of different kitchen equipment available, each of which may be used to prepare foods by only one or two cooking techniques. Therefore, multiple equipment items, such as separate grilles, ovens, pans, and kettles are often found in such kitchens. The requirement for multiple equipment increases both the initial capital costs, and the floor space requirements for food preparation kitchens, thus increasing the ultimate cost of food preparation in the kitchen. Thus, particularly in those cooking operations where equipment costs or space constraints are most sensitive, it would be desirable to reduce the number of separate equipment items required. In short, it would be preferable to combine the function of several types of equipment into a single cooking apparatus rather than to limit the menu or reduce capital costs by eliminating certain cooking techniques from the kitchen altogether.

One attempt at a combination type device of which I am aware is illustrated in U.S. Pat. No. 2,430,582, issued Nov. 11, 1947 to Reich for HEATING DEVICE. That patent illustrates, in FIGS. 9–12 and FIGS. 15–17, a cooking device such as a grille which has an upper frame with a pivoting electrical heater to provide from one side direct radiant heat and from the other side conducted heat (through a metal plate); thus this device can be used as a grille or as a broiler.

Another device is illustrated in U.S. Pat. No. 4,957,039, issued Sep. 18, 1990 to Reyes for a FIVE IN ONE COOKER. Reyes illustrates a swivel top portion which can be inverted from a dome configuration where the dome is used as a lid to control the heating of barbecue on grilles below, or to a pan configuration so that food can be cooked in the pan. However, in so far as I am aware, no institutional type dutch oven cookers have been proposed which allow flexibility to switch between cook and grille configurations.

Therefore, a continuing demand exists for a simple, space saving, and relatively inexpensive cooking apparatus which can be used as desired in many different cooking modes. The need for such devices is commonly seen in institutional settings, such as hospitals, prisons, nursing homes, or in commercial restaurant settings, particularly where space is at a premium.

SUMMARY

I have now invented, and disclose herein, a novel, improved cooking vessel which does not have the above-discussed drawbacks common to those heretofore used cooking devices of which I am aware. Unlike cookers heretofore available, my cooking vessel is compact, relatively inexpensive, easy to install and to service, and otherwise superior to the heretofore proposed ones. Most importantly, it is easy to switch between various cooking modes.

I have developed a novel apparatus for heating foods, liquids, or slurries. The apparatus includes a lower frame or base portion, and a lower or bottom pan portion which is supported by the lower frame portion. An upper frame is pivotally supported from the bottom pan portion. A top portion is provided, the top portion being pivotally affixed to the left and right sides of the upper frame.

The top portion includes a lid portion and a grille portion. In the preferred embodiment, the grille portion forms the inner wall surface of the lid portion, and is thus located in the upper reaches of the lid portion when the top portion is in a cooking position. When the top portion is rotated one hundred eighty (180) degrees, the grille portion provides an upwardly exposed grille surface for food preparation. Also, the top portion is shaped such that it may be lowered into and nested in the bottom pan portion when the upper frame is returned to a normal position for grille operation.

When hot oil or other fluid is used to heat the cooking apparatus, the bottom or lower pan portion further comprises a double wall portion. The double wall portion has an inner and an outer wall which form a fluid passageway therebetween. The fluid passageway has an inlet and an outlet for the heating fluid to enter and leave the passageway. Heating fluid heats the inner wall which thus heats the food being cooked. The top portion also further comprises a double exterior wall portion, and the double wall portion has an inner and an outer wall with a fluid passageway therebetween. The fluid passageway has an inlet and an outlet, whereby a heating fluid may be passed into the passageway in the bottom pan portion, or into the passageway in the top portion, or simultaneously into the bottom pan portion and the top portion passageways, so as to heat foods, liquids, or slurries contained in the cooking apparatus.

Thus it can be seen that my dutch oven type cook system cooks from all sides with hot oil. Alternately, the unit may be heated electrically. The tilt type upper frame and the versatile convertible top portion allow my cooking apparatus to bake, roast, fry, braise, broil, saute, steam, or kettle cook. The apparatus can also be used to grille in the short order style. A bottom draw off drain line is provided to allow pumping of cooked food into cryovac casings or pouches for ice water chill of cryovac casings, or for blast chill of the pan contents.

The various embodiments provide further variations in the heating configuration and in provision of the heating means. Aside from the foregoing, my novel cooking apparatus is simple, durable, and relatively inexpensive to manufacture.

OBJECTS, ADVANTAGES, AND FEATURES

The apparatus of the present invention has numerous significant advantages over the apparatus currently used in institutional and commercial cooking operations. From the foregoing, it will be apparent to the reader that one important and primary object of the present invention is to provide a single, multipurpose cooking apparatus which allows foods to be cooked in any one of a variety of selected techniques, where the list of possible cooking techniques which may be selected includes baking, roasting, frying, braising, broiling, grilling, steaming, or kettle cooking.

Other important but more specific objects and advantages of the invention reside in the provision of a cooking device as described in the preceding paragraph which:

may be quickly converted from either a pressure cooker to a grille, or vice-versa;

may be used as a steamer;

may be used as a stir fry pan;

may be used as a broiler;

is relatively compact and thereby conserves space;

is relatively simple;

is relatively inexpensive;

allows the foods to be discharged from the apparatus in a simple, one step manner;

Other important objects, features, and additional advantages of my invention will become apparent to the reader from the foregoing and the appended claims and as the ensuing detailed description and discussion proceeds in conjunction with the accompanying drawing.

DRAWINGS

These and other features, aspects and advantages of the present invention will become better understood with reference to the following description, appended claims, and accompanying drawings, wherein:

FIG. 1 is a perspective view of a cooking apparatus constructed in accord with the principles of the present invention, showing the top portion in a position for baking, roasting, broiling, or the like.

In the drawing, like parts will be noted with like reference numerals throughout the various figures, without further comment thereon.

DESCRIPTION

Figure 1:
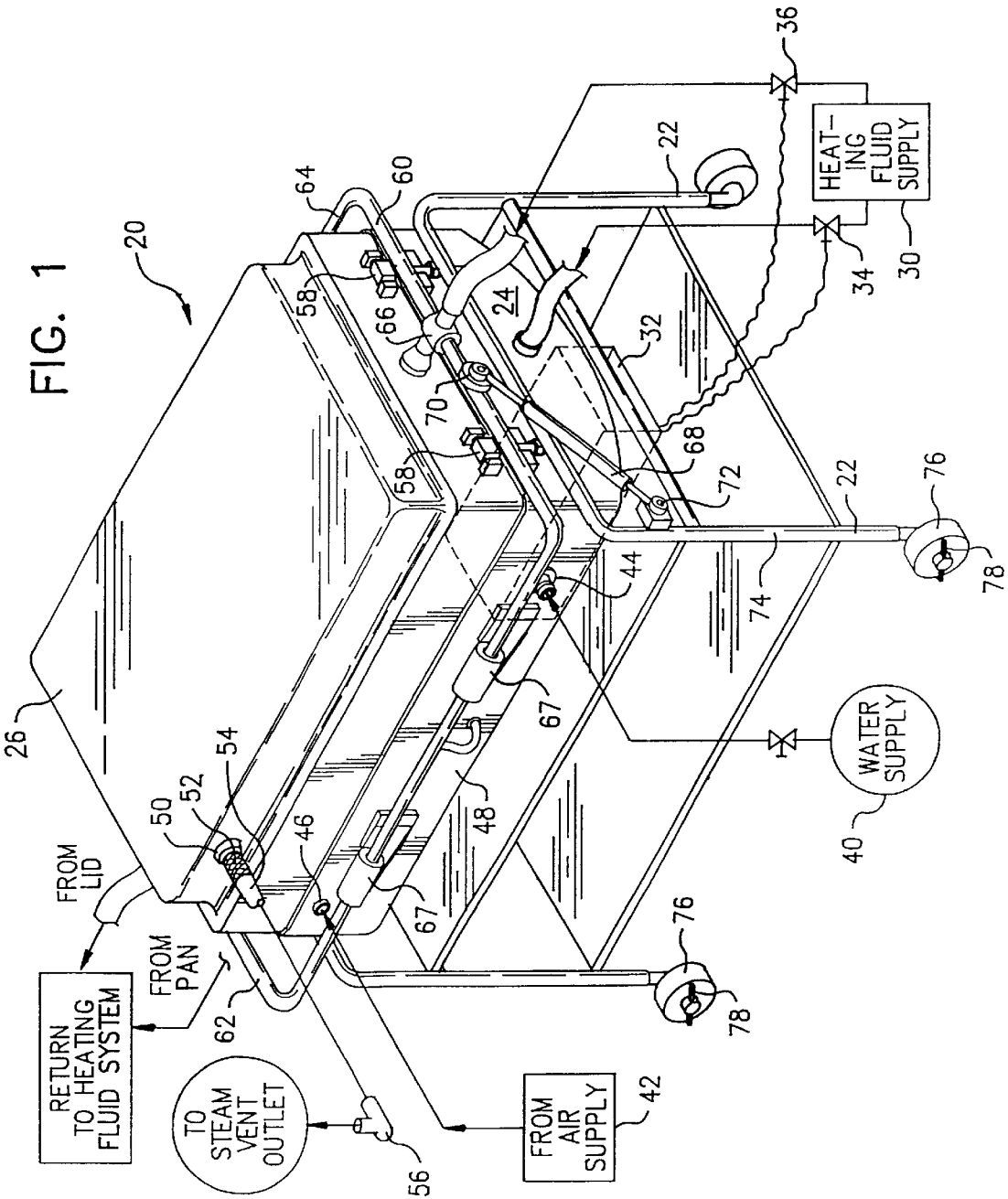

Referring now to the drawing and to the reference characters therein, FIG. 1 depicts, in its operative cooking position, a cooking apparatus 20 constructed in accord with, and embodying, the principles of the present invention.

Major components of the cooking apparatus 20 include: a lower frame or base portion 22, a bottom pan portion 24 which is supported from the base portion 22, and a combination grille and lid in top portion 26. The top portion 26 is supported in a manner so that it can be opened in order to place the food to be cooked (not shown) into the bottom pan portion 24, and so that the top portion 26 can be inverted about one hundred eighty degrees (180°) and thereafter used as a grille, as will be further described and illustrated herein below.

In one embodiment, the top portion 26 and the bottom pan portion 24 are each double-walled vessels having inner and outer walls with a fluid receiving passageway therebetween, as can be readily seen in FIG. 4 below. Returning to FIG. 1, a heating fluid supply source 30 provides a heating fluid such as hot oil or steam to heat the bottom pan portion 24 and the top portion 26. A control unit 32 controls the supply of heating fluid to bottom pan portion 24 and top portion 26 via way of regulation devices such as valves 34 and 36 respectively.

As it may be desirable to add steam or air directly to the interior formed between the bottom pan portion 24 and top portion 26 of the cooking apparatus 20, a water supply 40 and an air supply 42 are provided to the cooling apparatus 20. Preferably, connection both the water supply 40 and air supply 42 is by way of a flexible hose (not shown) attached to a quick connect type fitting 44 (for water) and 46 (for air) as indicated at the rear 48 of bottom pan portion 24. Vapors resulting from both the introduction of air or steam, or from the cooking of foods, are allowed to escape from the interior of the apparatus 20 and are vented through the top portion 26 via way of a steam vent outlet 50. This outlet 50 is also preferably provided via way of a quick connect fitting 52 attached to a flexible hose 54. Normally, a vent outlet system also includes pressure regulating means such as an adjustable pressure relief valve 56, so that the cooking apparatus 20 may be used as a pressure cooker. Valve 56 allows the cook to set the internal pressure of the apparatus 20 somewhat above atmospheric pressure up to a rated pressure such as 8 psig (and normally not above 15 psig). When used as a pressure cooker, the cooking apparatus 20 may have the top portion 26 secured to bottom pan portion 24 via way of snap levers or similar latches or fasteners 58.

As illustrated in this FIG. 1, the top portion 26 is supported by, and rotates within and between the left 60 and right 62 ends of upper frame 64. A pivot joint 66 at the left end 60 and companion pivot joint 66 on right end 62 of upper frame 64 provide the freedom of movement necessary for rotation of top portion 26. Movement of top portion 26 is possible once the top portion 26 is raised to an open position as illustrated in FIG. 4 below.

The upper frame 64 is in turn supported from the rear 48 of bottom pan portion 24 by hinges 67. A combination spring lift/shock damper 68 is positioned between a first pivot pin 70 at upper frame 64 and a second pivot pin 72 affixed to the rear 74 of lower frame 22. The purpose of the shock damper 68 is primarily to prevent the top portion 26 from closing at an undesirably rapid rate from an open position. Damper 68 may also assist in slightly biasing the upper frame 64 toward an open position. For ease in moving the cooking apparatus 20 between locations in a kitchen, or to assist with access for cleaning, lower frame 22 is provided with rollers 76, preferably with locking mechanism 78 to prevent the cooking apparatus 20 from moving when set at a desired location.

Figure 2:
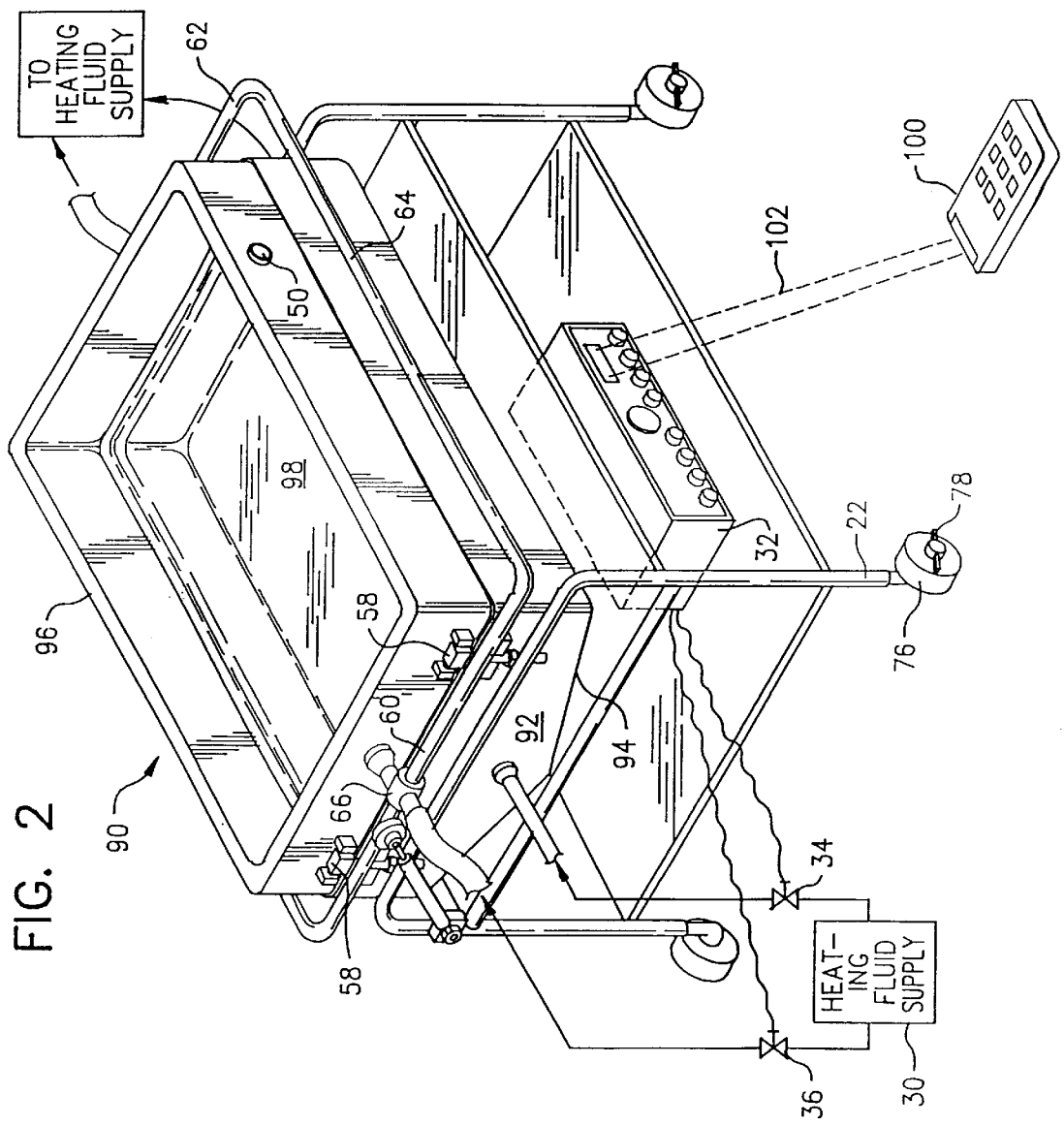
FIG. 2 is a perspective view of the lower or bottom pan portion of a second embodiment of the cooking apparatus constructed in accord with the principles of the present invention, showing the use of flat segments for construction of the bottom pan portion, and also illustrating the use of a remote control device for setting the cook conditions.

Attention is now directed at the rounded bottom 80 of bottom pan portion 24 as shown in FIG. 1. This type of construction may be desirable in many applications, such as pressure cooker usage, but it generally increases the cost of apparatus 20. In contrast, in FIG. 2 is shown a second embodiment of my invention, cooking apparatus 90, which is similar to apparatus 20 shown in FIG. 1, but constructed with a bottom pan portion 92 having a segmented flat bottom 94. The flat bottom 94 construction is somewhat cheaper to fabricate, and also may be more desirable for some types of cooking such as stir-fry or other oriental type cooking techniques.

Also in FIG. 2, the top portion 96 with combination grille and lid is turned upside down as compared to top portion 26 of FIG. 1. Therefore, in FIG. 2, top portion 96 is shown with its interior, grill forming surface 98 upward. Quick conversion of the top portion 96 between a lid or cooking position, as illustrated in FIG. 1, and a grill position, as shown in FIG. 2, by way of simple rotation of the top portion 96, is a unique and important advantage of my cooking apparatus 20.

A remote control unit 100 is also shown in this FIG. 2. The remote control unit 100 can be used to program or reprogram the control unit 32 on the cooking apparatus 90. Typical remote control units 100 use an infrared signal 102 which is broadcast from the remote control unit 100 and is received at the control unit 32, similar to television or video recorder type remote control units. The use of a remote control unit 100 may be especially important in some institutional settings, such as prisons, where it may be desirable to set or reset the cooking device independently and without the ability of local personnel to immediately readjust the control unit 32, so as to prevent the occurrence of sabotage to the cooking cycle.

Figure 3:
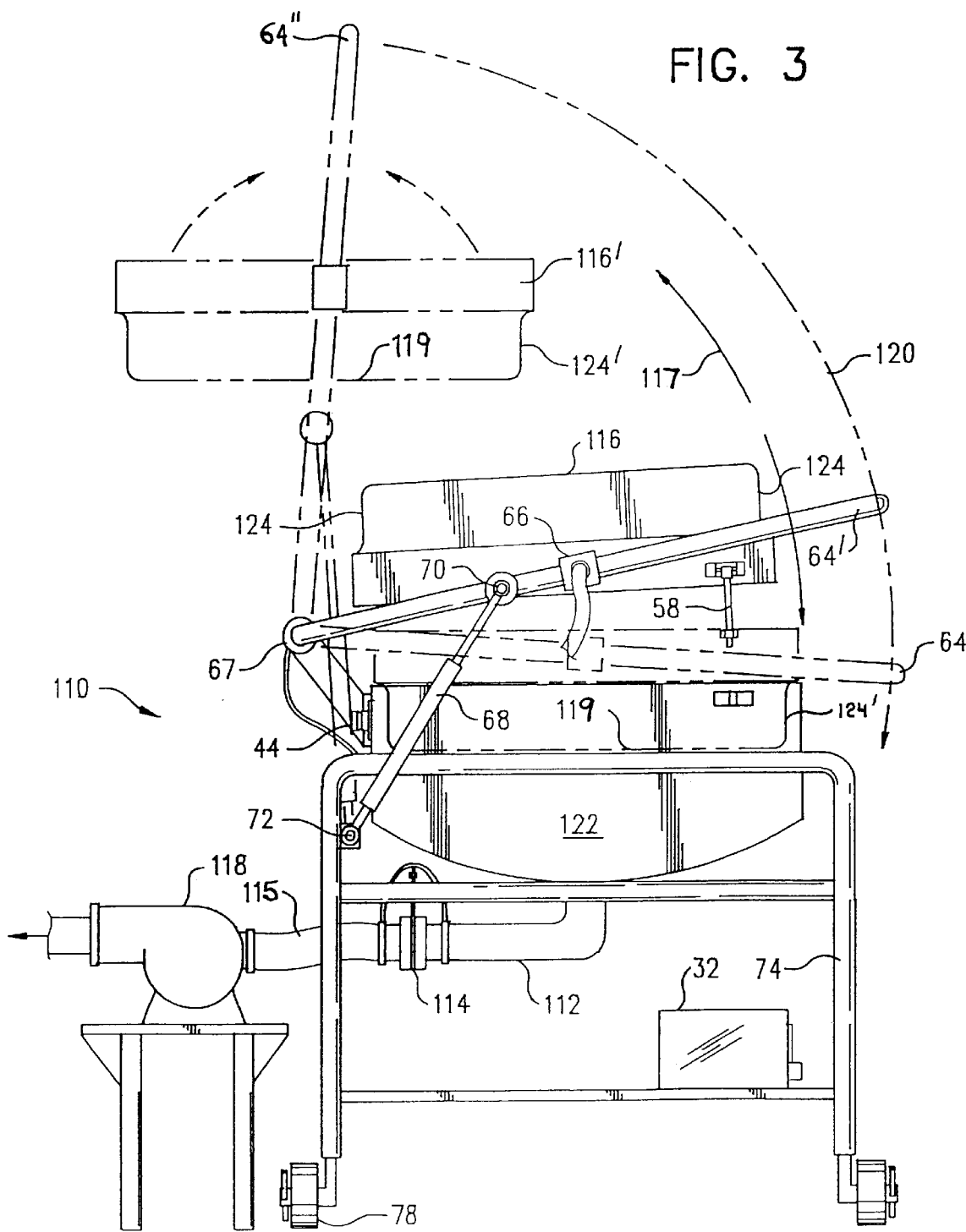
FIG. 3 is a side view of a cooking apparatus similar to that set forth in FIG. 1 above, constructed in accord with the present invention with the top portion initially indicated in the cooker or broiler position, and also showing in hidden lines the upper frame at an open position wherein the top portion is being inverted to the grille position.

Turning now to FIG. 3, a side view of a cooking apparatus 110 is shown. Apparatus 110 is similar to the apparatus 20 first shown in FIG. 1 above, although here a bottom drain line 112 is also shown. This drain line 112 is preferably supplied in stainless steel of any desired size to accommodate the cooking apparatus size; for conventional sized units a nominal three inch (3") drain line 112 is satisfactory. Output from the drain line 112 is controlled by a knife type valve 114, and a line 115 to an outlet pump 118 is provided. The discharge from an outlet pump 118 may be sent to a cryovac pump and fill type bagging system (not shown) or other system for receiving the food slurry leaving the cooking apparatus 110. For example, chili may be cooked in cooking apparatus 110, and then drained through bottom drain line 112 and pumped into cryovac bags to be cooled down in an ice bath for subsequent storage and/or freezing. This bottom drain line 112 feature is important since cooking apparatus 110 may be normally of a forty (40) to eighty (80) gallon size for commercial or institutional service, with a unit in the sixty (60) gallon size range expected to be commonly required.

In FIG. 3 the transformation of the top portion 116 from cooking service to grill service is illustrated in hidden lines. The top portion 116 is shown in cooking service or a lid position in solid lines. By moving upper frame 64 upward, in the direction of reference arrow 117, through the position indicated by reference numeral 64' and on upward to the position indicated by reference numeral 64", clearance is achieved to rotate the top portion 116 to the grille position indicated by reference numeral 116'. An interior grill surface 119 is provided, which is upward when the top portion 116 is turned upward to the position indicated by reference numeral 116'. When the top portion 116 is moved downward in the direction of reference arrow 120 and nested in the bottom pan portion 122, the top portion 116 provides a convenient grille surface 119. Note that the top portion 116 has a lower outer sidewall portion 124 which is sized for the close fitting insertion (shown as 124') necessary to nest the lid 116 against the inner wall 126 (See FIG. 4 below) of the bottom pan portion 122.

Figure 4:
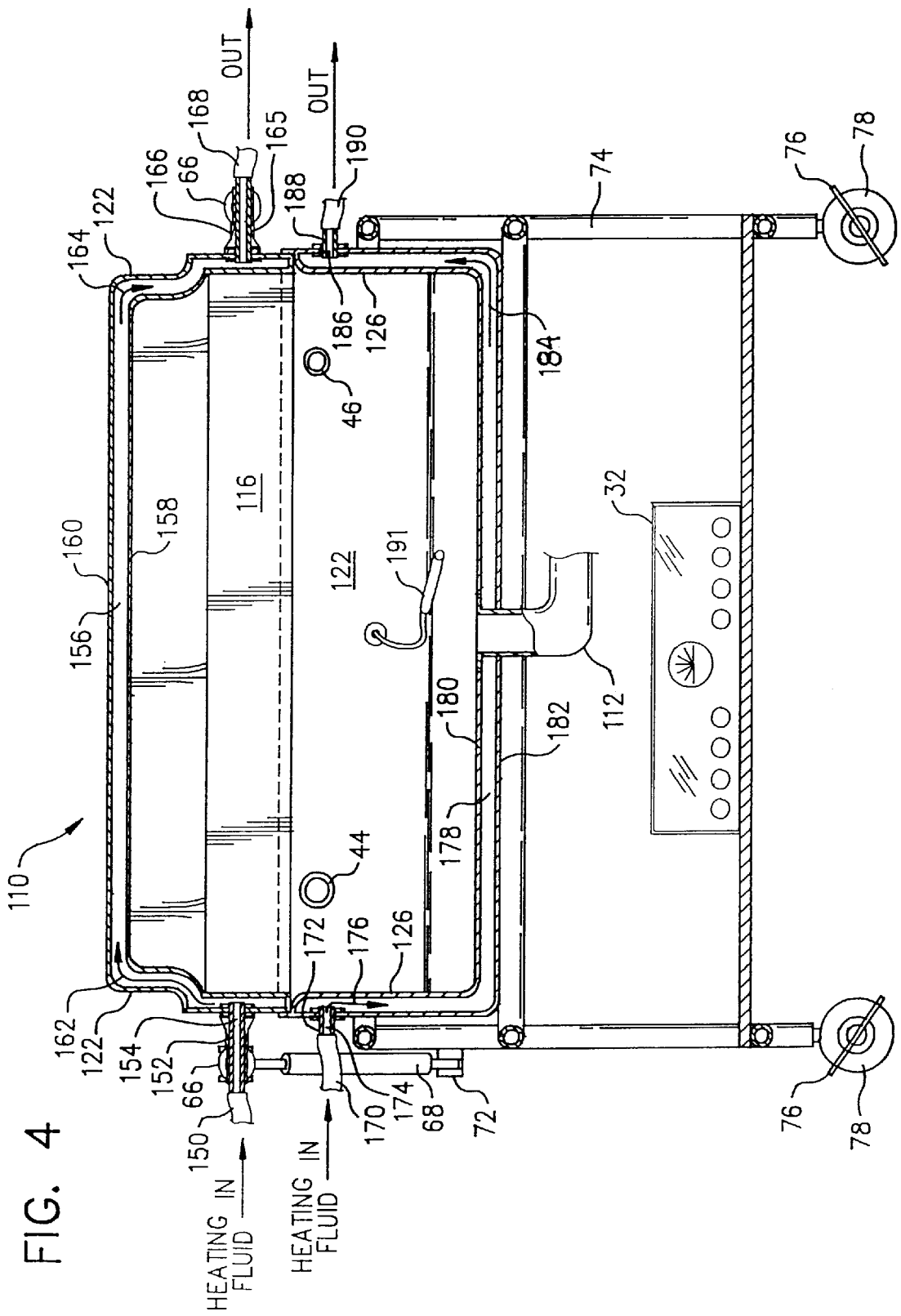
FIG. 4 is a vertical cross sectional view of my cooking apparatus, shown with the top portion of the cooking apparatus positioned in the cooking or broiling position, and additionally showing the flow passageways for a heating fluid.

Turning now to FIG. 4, a vertical cross section of apparatus 110 is shown. In this FIG. 4, the double wall construction of both the bottom pan portion 122 and the top portion 116 are readily apparent. Heating fluid contained in hose 150 flows into the top portion 116 through inlet 152. Inlet 152 has a fluid passageway 154 therein which communicates with passageway 156 in top portion 116. Passageway 156 is defined between the inner 158 and outer 160 walls of top portion 116. The heating fluid circulates in passageway 156 as indicated by reference arrow 162, so as to heat inner wall 158. The circulating heating fluid then proceeds through the top portion 116 as indicated by reference arrow 164, then leaves top portion 116 through passageway 165 in outlet 166, thence to hose 168. During the period of heating provided by contact of the heating fluid with inner wall 158, sufficient heat must be applied to heat the food on grille portion 119, or as necessary to provide a portion of the heat required to heat the food in the bottom pan portion 122 (when and as it is used).

Similar to the process just described for the top portion 116, heating fluid enters the bottom pan portion 122 through hose 170 and inlet 172 having a passageway 174 therein. Heating fluid then proceeds downward in the direction of reference arrow 176 in the passageway 178 which is defined between inner bottom wall 180 and outer bottom wall 182. Heating fluid exits in the direction of reference arrow 184 and proceeds through passageway 186 in outlet 188, thence on through outlet hose 190. Just as described with reference to cooking apparatus 90 in FIG. 2 above, the flow of heating fluid to either the top portion 116 or bottom pan portion 122 of apparatus 110 may be regulated by control valves or the like (not shown) to control the cooking temperature to any desired level as regulated by control unit 32. Feedback to the control unit 32 may be provided by way of temperature sensing unit 191.

Figure 5:
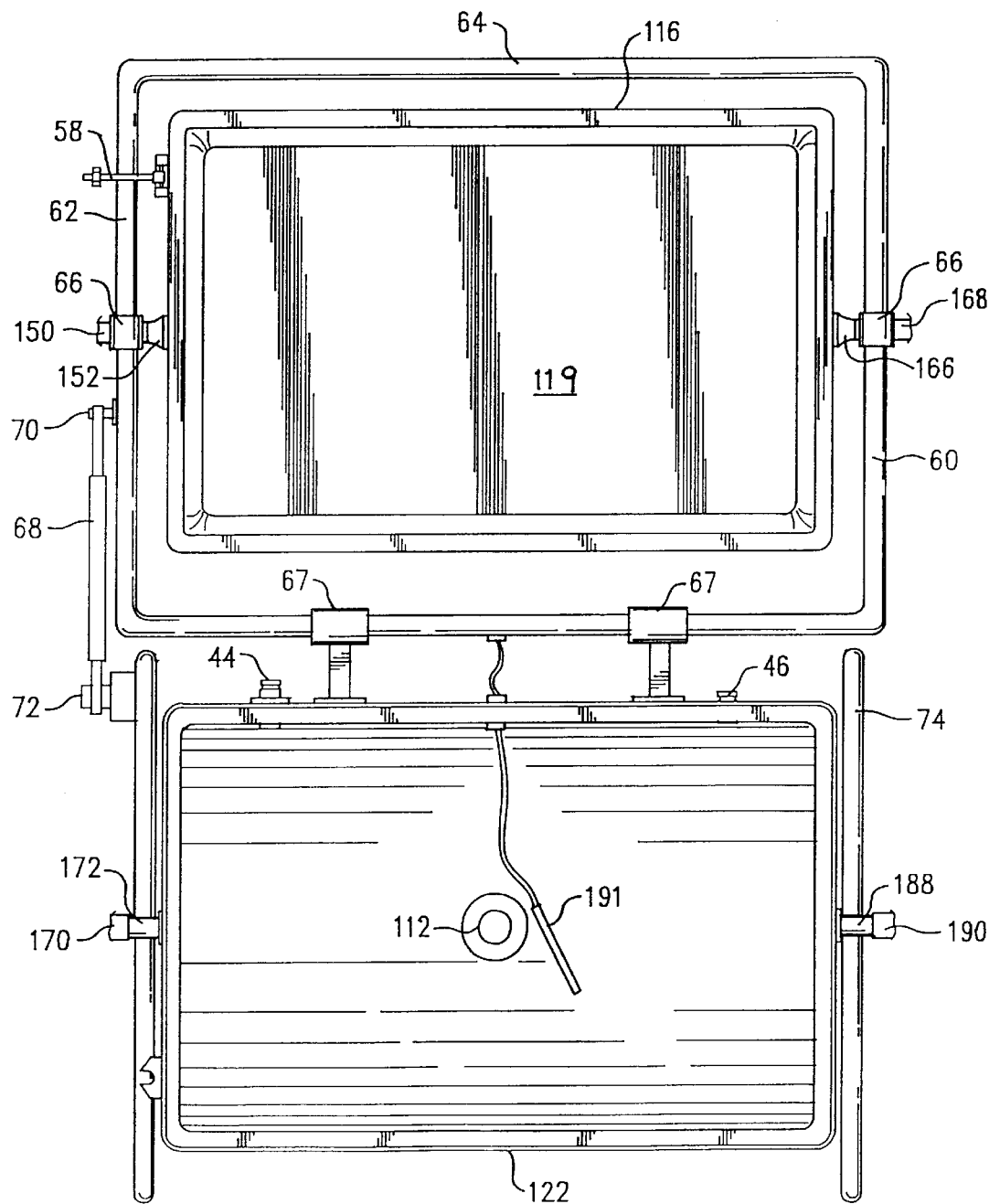
FIG. 5 is a top plan view of the embodiment of the cooking apparatus shown in FIG. 1 above, now with the upper frame opened outward horizontally in an extended position so as to fully reveal the cooking surfaces in both the bottom pan portion and the top portion.

Attention is now directed to FIG. 5, wherein a top plan view of the apparatus 110 which was first depicted in FIG. 3 above is set forth. Here, the top portion 116 is fully extended outward, and has been rotated along with the upper frame 64 so that the interior grille surface 119 is upwardly exposed. Also, it can be further seen how the right side 60 and left side 62 of upper frame 64 support rotary joints 66. The joints 66 allow the top portion 116 to rotate and to receive heating fluid by way of the inlet 152, and discharge heating fluid thru the outlet 166 fittings. Alternately, cooling fluid could be used via these same inlet and outlet passages to cool food in the apparatus 110.

Figure 6:
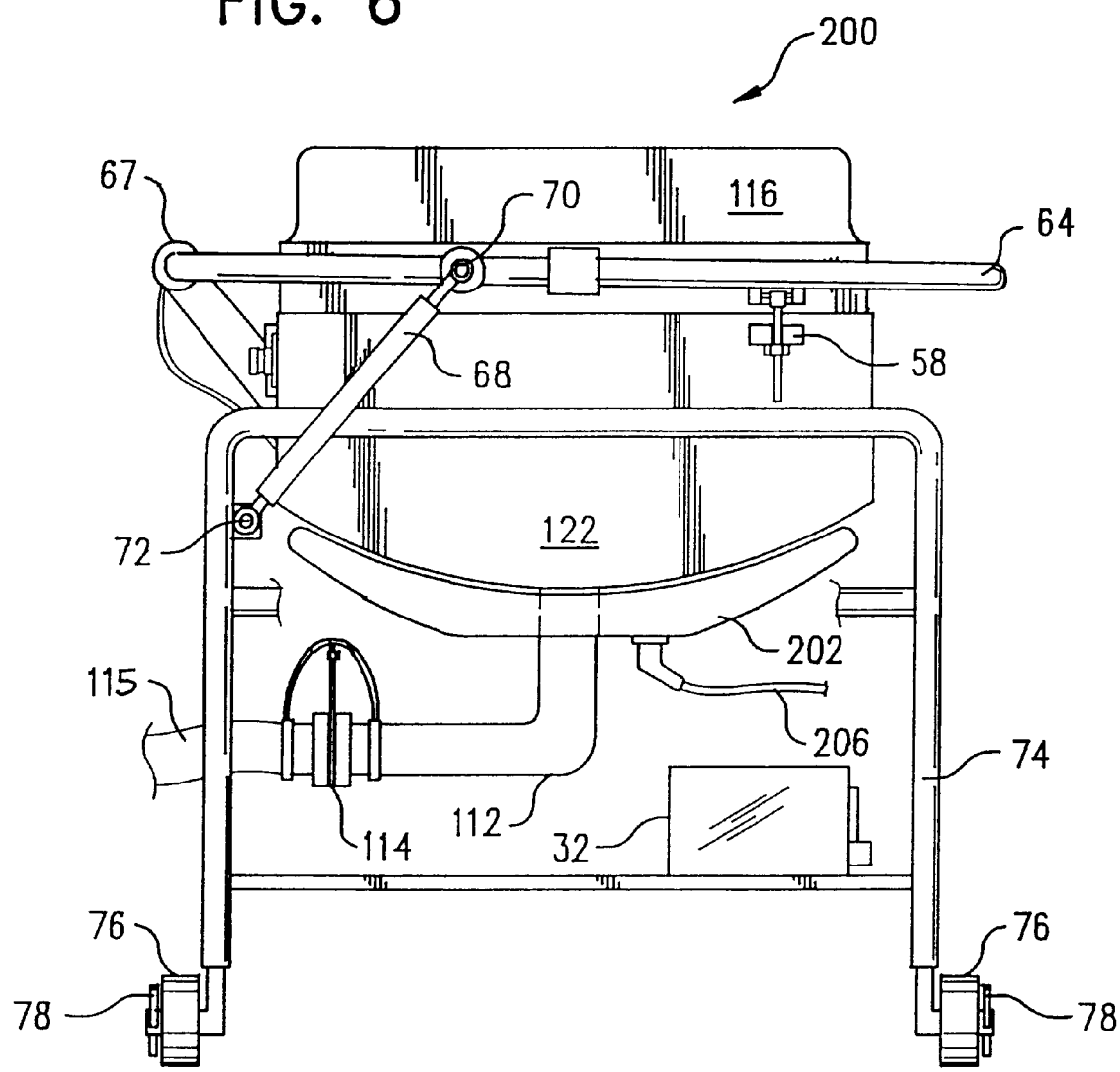
FIG. 6 is a third embodiment of my invention, showing the use of a gas heating system to heat the bottom pan or kettle portion.

FIG. 6 illustrates a cooking apparatus 200, which illustrates a third embodiment of my invention. Apparatus 200 is different from the first or second embodiments in that heating is provided by way of gas burners 202 under the bottom pan portion 122. Gas may be supplied via hose 206 from natural gas, propane, or other suitable supply source. In this embodiment, the top portion 116 is heated with electricity.

In the same manner as set forth in the earlier embodiments, the top portion 116 of the cooking apparatus 200 is rotatably secured between left and right sides of the upper frame 64, so that the top portion 116 can be readily changed between the cooking and grilling configurations.

Figure 7:
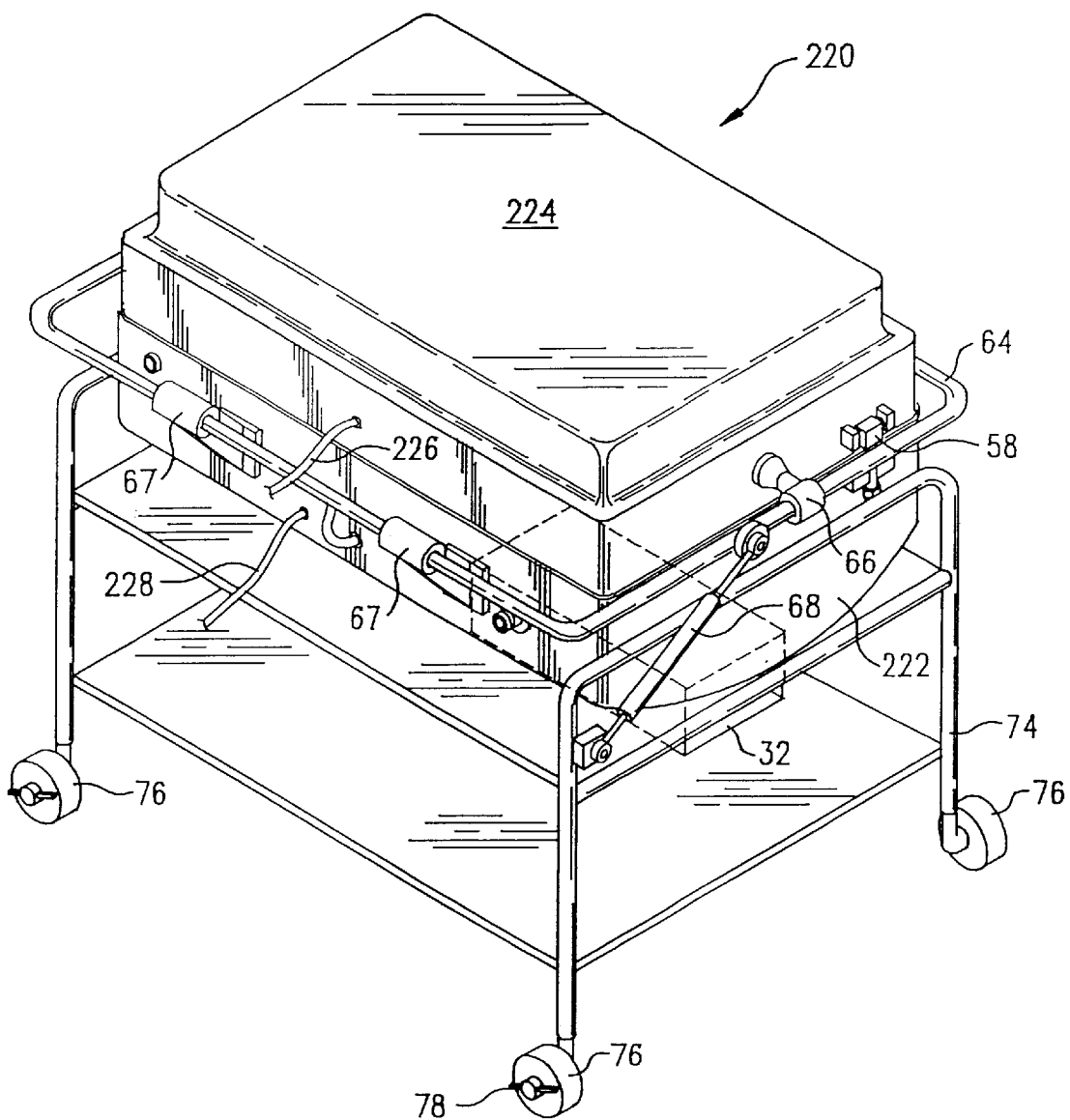
FIG. 7 is a fourth embodiment of my cooking device, showing the use of electrical heating elements to heat the bottom pan portion and the top portion, including the upper grille.

Still another embodiment of my invention is set forth in FIG. 7. This embodiment is similar to the designs set forth in the earlier figures, however, heating is provided to apparatus 220 via way of electric heating elements (not shown) which are supplied to bottom pan portion 222 and top portion 224 via shielded electrical power cables 226 and 228, respectively.

It is clear from the heretofore described figures that the present invention as described by cooking apparatus 20, 90, 110, 200, or 220 above provides a simple convertible dutch oven type apparatus which may be easily rotated between operating positions, and which may be releaseably secured at either position.

It will be readily apparent to the reader that the present invention may be easily adapted to other embodiments incorporating the concepts taught herein and that the present figures are shown by way of example only and not in any way a limitation. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; all changes which come within the meaning and range of equivalences of the claims are therefore intended to be embraced therein.

What is claimed is:

1. An apparatus for heating foods, liquids, or slurries, said apparatus comprising:
   (a) a lower frame portion,
   (b) a bottom pan portion, said bottom pan portion supported by said lower frame portion,
   (c) an upper frame, said upper frame pivotally supported from said bottom pan portion, and
   (d) a top portion,
      (i) said top portion pivotally affixed to said upper frame, and
      (ii) said top portion including a lid portion and a grille portion,
   (e) said upper frame further comprising
      (i) a left end, said left end further comprising a first pivot, and
      (ii) a right end, said right further comprising a second pivot,
   (f) wherein said first and said second pivot cooperate to allow said top portion to be rotated thereabout when said upper frame is raised, from
      (i) a closed, fitting position, wherein said lid portion of said top portion is interfittingly located at said bottom pan portion,
      (ii) to an extended, open position, wherein said upper frame is sufficiently upward so that said top portion is rotatable so as to interchange positions of said lid portion and said grille portion, and
   (g) wherein said top portion is shaped such that said lid portion is nestable in said bottom pan portion when said upper frame is returned to said closed, fitting position.

2. An apparatus for heating foods, or liquids, or slurries, said apparatus comprising:
   (a) a lower frame portion,
   (b) a bottom pan portion, said bottom pan portion supported by said lower frame portion,
   (c) an upper frame, said upper frame pivotally supported from said bottom pan portion, and
   (d) a top portion,
      (i) said top portion pivotally affixed to said upper frame, and
      (ii) said top portion including a lid portion and a grille portion,
   (e) said bottom pan portion further comprising a double wall portion, said double wall portion including an inner and an outer wall which form a fluid passageway therebetween, said fluid passageway having an inlet and an outlet,
   (f) said top portion further comprising a double exterior wall portion, said double wall portion including an inner and an outer wall with a fluid passageway therebetween, said fluid passageway having an inlet and an outlet,
   (g) whereby a heating fluid may be passed
      (i) into said fluid passageway in said bottom pan portion, or
      (ii) into said fluid passageway in said top portion, or
      (iii) simultaneously into said fluid passageways in said bottom pan portion and into said fluid passageways in said top portion,
   (h) so as to heat said foods, or said liquids, or said slurries located in said bottom pan portion or on said grille portion of said apparatus.

3. The apparatus as set forth in claim 2, further including a first regulating means adapted to regulate the flow of said heating fluid into said bottom pan portion.

4. The apparatus as set forth in claim 3, further including a second regulating means adapted to regulate the flow of said heating fluid into said top portion.

5. The apparatus as set forth in claim 2, wherein
   (a) said upper frame further comprises a left end and a right end, and wherein said right end further comprises a first pivot, and wherein said left end further comprises a second pivot, and wherein said first and said second pivots cooperate to allow said top portion to be rotated, when said upper frame has been raised
      (i) from a closed, fitting position, wherein said top is in place so that said lid portion covers said bottom pan portion,
      (ii) to an extended, open position, wherein said upper frame is sufficiently extended upward so that said top portion is rotatable to convert said lid portion to a grille portion, and
   (b) wherein said grille portion is upwardly exposed when said lid portion is rotated downward,
   (c) and wherein said top portion is shaped such that said top portion may be lowered into and nested in said bottom pan portion when said upper frame is returned to a resting position.

6. A cooking apparatus having a top portion and a bottom pan portion, said apparatus configured to supply heating fluid to the top portion or to the top and bottom portions thereof, said apparatus comprising:
   (a) a top portion, said top portion further comprising at least one inlet and at least one outlet,
   (b) a bottom pan portion, said bottom pan portion comprising at least one inlet and at least one outlet,
   (c) a first fluid passageway, said first fluid passageway comprising a conduit between said inlet and said outlet in said top portion, and
   (d) a second fluid passageway, said second fluid passageway comprising a conduit between said inlet and said outlet in said bottom pan portion,
   (e) a regulator for regulating the passage of heating fluid into said lid portion and into said bottom pan portion, (i) in a first, single fluid flow relationship wherein heating fluid is allowed to flow through said first fluid passageway, or (ii) in a second, multiple fluid flow relationship wherein (a) heating fluid is allowed to flow through said fluid passageways in said top portion, and (b) heating fluid is allowed to flow through said fluid passageways in said bottom an portion.

7. The cooking apparatus defined in claim 6, further comprising a latch, said latch adapted to releasably secure said top portion to said bottom pan portion, said latch of sufficient strength so as to withstand a predetermined internal pressure within the compartment formed by securing said top portion and said bottom an portion together.

8. The cooking apparatus as defined in claim 7, wherein said predetermined internal pressure is up to 15 pounds per square inch.

9. The cooking apparatus as defined in claim 7, wherein said predetermined internal pressure is up to 8 pounds per square inch.

10. The cooling apparatus as set forth in claim 6, wherein said regulator further comprises a remote control unit, said remote control unit adapted to send a wireless signal to said regulator for adjustment of said regulator.

11. A The cooking apparatus as set forth in claim 2, further comprising a bottom drain line, said bottom drain line adapted to receive for transport said food, liquid, or slurry from said bottom pan portion.

12. The cooking apparatus as set forth in claim 11, wherein said bottom drain line further comprises a knife type shutoff valve.

13. The cooling apparatus as set forth in claim 11, further comprising an outlet pump, and wherein said drain line transports said food, liquid, or slurry to said outlet pump for discharge.

14. The cooking apparatus as set forth in claim 2, wherein said bottom pan portion has a capacity of at least forty gallons.

15. The cooking apparatus as set forth in claim 2, wherein said bottom pan portion has capacity of up to about eighty gallons.

16. The cooking apparatus as set forth in claim 2, wherein said bottom pan portion is comprised of segmented flat portions.

17. An apparatus for heating foods, liquids, or slurries, said apparatus comprising:

(a) a lower frame portion, (b) a bottom pan portion, said bottom pan portion supported by said lower frame portion, (c) an upper frame, said upper frame pivotally supported from said lower frame portion, and (d) an top portion, (i) said top portion pivotally affixed to said upper frame, and (ii) said top portion including (A) a lid portion, and (B) a grille portion, (e) said upper frame further comprising (i) a left end, said left end further comprising a first pivot, and (ii) a right end, said right further comprising a second pivot, (f) wherein said first and said second pivot cooperate to allow said top portion rotate along an axis therebetween when said upper frame is raised from (i) a closed position, wherein said top portion either (A) provides its lid portion to interfittingly cover said bottom pan portion, or (B) provides its grille portion to interfittingly cover said bottom pan portion, (ii) to an extended, open position, wherein said upper frame is sufficiently extended upward so that said top portion is rotatable to interchange said lid portion and said grille portion, and wherein said lid portion is shaped such that said lid portion is nestable in said bottom pan portion when said upper frame is returned to said closed position; and (g) wherein said bottom pan portion further comprises a gas heating burner portion.

18. The cooking apparatus as set forth in claim 17, wherein said top portion is heated with electricity.

19. The cooking apparatus as set forth in claim 1, further comprising a shock absorber, said shock absorber mounted between said lower frame portion and said upper frame, said shock absorber adapted to brake the downward fall of the weight of said upper frame and said top portion, so as to prevent said top portion from rapidly falling into said bottom pan portion.

20. The cooking apparatus as set forth in claim 19, wherein said shock absorber further comprises a lift portion, said lift portion adapted to urge said upper frame and said top portion toward an upwardly extended open position.

* * * * *